US012577387B2

(12) United States Patent
Kita et al.

(10) Patent No.: US 12,577,387 B2
(45) Date of Patent: Mar. 17, 2026

(54) ALDEHYDE SCAVENGER AND RESIN COMPOSITION

(71) Applicant: SANYO CHEMICAL INDUSTRIES, LTD., Kyoto (JP)

(72) Inventors: Ai Kita, Kyoto (JP); Makoto Matsumoto, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 642 days.

(21) Appl. No.: 17/923,044

(22) PCT Filed: May 12, 2021

(86) PCT No.: PCT/JP2021/018116

§ 371 (c)(1),
(2) Date: Nov. 3, 2022

(87) PCT Pub. No.: WO2021/230303

PCT Pub. Date: Nov. 18, 2021

(65) Prior Publication Data

US 2023/0193015 A1 Jun. 22, 2023

(30) Foreign Application Priority Data

May 13, 2020 (JP) ................................ 2020-084300

(51) Int. Cl.
*C08L 33/26* (2006.01)
*C08L 33/08* (2006.01)
*C08L 33/12* (2006.01)
*C08L 79/02* (2006.01)

(52) U.S. Cl.
CPC ............... *C08L 33/26* (2013.01); *C08L 33/08* (2013.01); *C08L 33/12* (2013.01); *C08L 79/02* (2013.01); *C08L 2205/06* (2013.01)

(58) Field of Classification Search
CPC .......... C08L 33/26; C08L 33/08; C08L 33/12; C08L 79/02; C08L 2205/06; C08L 101/00; A61L 9/01; A61L 9/014; B01J 20/26; B01J 20/28; B01J 20/261; C08F 220/06; C08F 220/56
See application file for complete search history.

(56) References Cited

U.S. PATENT DOCUMENTS

| | | | |
|---|---|---|---|
| 2006/0052492 A1 | 3/2006 | Harashina et al. | |
| 2007/0078204 A1 | 4/2007 | Komatsu et al. | |

FOREIGN PATENT DOCUMENTS

| | | | |
|---|---|---|---|
| CN | 1732223 | 2/2006 | |
| CN | 101176795 | 5/2008 | |
| CN | 110819200 | 2/2020 | |
| JP | 2004-129926 | 4/2004 | |
| JP | 2008-163102 | 7/2008 | |
| JP | 2012-180420 | 9/2012 | |
| JP | 2018-145278 | 9/2018 | |
| WO | 2005/040275 | 5/2005 | |
| WO | WO-2018218470 A1 * | 12/2018 | .............. C08L 23/12 |
| WO | 2019/101556 | 5/2019 | |
| WO | WO-2019101556 A1 * | 5/2019 | ........... C09D 133/14 |

OTHER PUBLICATIONS

International Search Report issued Jul. 13, 2021 in corresponding International (PCT) Patent Application No. PCT/JP2021/018116.

* cited by examiner

*Primary Examiner* — Mark Eashoo
*Assistant Examiner* — Cullen L G Davidson
(74) *Attorney, Agent, or Firm* — Wenderoth, Lind & Ponack, L.L.P.

(57) ABSTRACT

The present invention aims to provide an aldehyde scavenger which has excellent aldehyde scavenging properties and yields a resin composition with excellent moldability (mold fouling resistance) when added to a resin. The present invention relates to an aldehyde scavenger containing at least one of: (1) a copolymer (A) containing a (meth)acrylamide (a) and an acid group-containing unsaturated monomer (b) as constituent monomers; and (2) a mixture containing a (co)polymer (B) and a (co)polymer (C), the (co)polymer (B) containing the (meth)acrylamide (a) as a constituent monomer but not containing the acid group-containing unsaturated monomer (b) as a constituent monomer, and the (co)polymer (C) containing the acid group-containing unsaturated monomer (b) as a constituent monomer but not containing the (meth)acrylamide (a) as a constituent monomer.

6 Claims, No Drawings

ALDEHYDE SCAVENGER AND RESIN COMPOSITION

TECHNICAL FIELD

The present invention relates to aldehyde scavengers. The present invention also relates to resin compositions.

BACKGROUND ART

Recently, release of aldehyde compounds such as formaldehyde and acetaldehyde from building materials and automotive components has become an issue. In response to the issue, addition of dihydrazide compounds as scavengers has been proposed (e.g., Patent Literature 1).

CITATION LIST

Patent Literature

Patent Literature 1: WO 2005/040275

SUMMARY OF INVENTION

Technical Problem

The technique disclosed in Patent Literature 1 however does not sufficiently solve the issue of release of aldehydes. For such an issue, aldehyde scavengers with excellent aldehyde scavenging properties have been required to develop.

The present invention aims to provide an aldehyde scavenger which has excellent aldehyde scavenging properties and yields a resin composition with excellent moidability (mold fouling resistance) when added to a resin.

Solution to Problem

The present inventors arrived at the present invention as a result of their extensive studies to achieve the object. In other words, the present invention relates to an aldehyde scavenger containing at least one of:

(1) a copolymer (A) containing a (meth)acrylamide (a) and an acid group-containing unsaturated monomer (b) as constituent monomers; and (2) a mixture containing a (co)polymer (B) and a (co) polymer (C), the (co)polymer (B) containing the (meth)acrylamide (a) as a constituent monomer but not containing the acid group-containing unsaturated monomer (b) as a constituent monomer, and the (co)polymer (C) containing the acid group-containing unsaturated monomer (b) as a constituent monomer but not containing the (meth)acrylamide (a) as a constituent monomer. The present invention also relates to a resin composition containing the aldehyde scavenger and at least one resin selected from the group consisting of polyester resins, polyacetal resins, polyolefin resins, phenolic resins, urethane resins, melamine resins, urea resins, and urea-melamine resins.

Advantageous Effects of Invention

The aldehyde scavenger of the present invention achieves the following effects.

(1) The aldehyde scavenger has excellent aldehyde scavenging properties (particularly formaldehyde scavenging properties).

(2) A resin composition containing the aldehyde scavenger has excellent moldability (mold fouling resistance).

DESCRIPTION OF EMBODIMENTS

The aldehyde scavenger of the present invention contains at least one of the following (1) and (2):

(1) a copolymer (A) containing a (meth)acrylamide (a) and an acid group-containing unsaturated monomer (b) as constituent monomers; and (2) a mixture containing a (co)polymer (B) and a (co) polymer (C), the (co)polymer (B) containing the (meth) acrylamide (a) as a constituent monomer but not containing the acid group-containing unsaturated monomer (b) as a constituent monomer, and the (co)polymer (C) containing the acid group-containing unsaturated monomer (b) as a constituent monomer but not containing the (meth)acrylamide (a) as a constituent monomer.

The copolymer (A) and/or the (co)polymer (B) and the (co)polymer (C) are usually used as active ingredients in the aldehyde scavenger of the present invention.

<(Meth)acrylamide (a)>

Examples of the (meth)acrylamide (a) in the present invention include methacrylamide and acrylamide.

Preferred among the (meth)acrylamides (a) is acrylamide from the viewpoint of aldehyde scavenging properties.

The term "(meth)acrylic/(meth)acryl" means acrylic/acryl or methacrylic/methacryl.

<Acid Group-Containing Unsaturated Monomer (b)>

Examples of an acid group of the acid group-containing unsaturated monomer (b) in the present invention include a carboxyl group, a phosphoric acid group, and a sulfonic acid group. Herein, the acid group-containing unsaturated monomer (b) is also referred to as a monomer (b).

Preferred among the acid groups is a carboxyl group from the viewpoint of aldehyde scavenging properties.

Examples of the acid group-containing unsaturated monomer (b) include monomers such as a carboxyl group-containing unsaturated monomer (b1), a phosphoric acid group-containing unsaturated monomer (b2), and a sulfonic acid group-containing unsaturated monomer (b3), which are described below. These monomers (b) may be used alone or in combination of two or more.

Examples of the carboxyl group-containing unsaturated monomer (b1) include (meth)acrylic acid, maleic acid, fumaric acid, itaconic acid, vinyl benzoic acid, vinyl acetic acid, mono(2-(meth)acryloyloxy ethyl) succinate, mono-2-((meth)acryloyloxy)ethyl phthalate, and 2-(meth) acryloyloxyethyl hexahydrophthalic acid monoesters.

Examples of the phosphoric acid group-containing unsaturated monomer (b2) include vinylphosphonic acid, diethylvinylphosphonate, and phenylvinylphosphonic acid. Examples of the sulfonic acid group-containing unsaturated monomer (b3) include vinylsulfonic acid, allylsulfonic acid, methallylsulfonic acid, alkyl (preferably C1-C23 alkyl) allylsulfosuccinic acid, 2-acrylamido-2-methylpropanesulfonic acid, vinylbenzenesulfonic acid, dodecenebenzenesulfonic acid, sulfoalkyl (meth)acrylates, and 4-vinylbenzenesulfonic acid.

Preferred among the monomers (b) is the carboxyl group-containing unsaturated monomer (b1), with (meth)acrylic acid being more preferred, from the viewpoint of aldehyde scavenging properties.

From the viewpoint of aldehyde scavenging properties, in the present invention, the weight ratio [(a)/(b)] of the (meth) acrylamide (a) to the acid group-containing unsaturated monomer (b) is preferably 40/60 to 99/1, more preferably 60/40 to 98/2, still more preferably 75/25 to 97/3. The weight ratio [(a)/(b)] is the weight ratio of the total weight of the (meth)acrylamide (a) contained as a constituent monomer in the (co)polymer(s) in the aldehyde scavenger to the total weight of the monomer (b) contained as a constituent monomer in the (co)polymer(s) in the aldehyde scavenger.

<Copolymer (A)>

The copolymer (A) in the present invention contains the (meth)acrylamide (a) and the acid group-containing unsaturated monomer (b) as constituent monomers (hereinafter also referred to as constituent units).

The weight ratio [(a)/(b)] of the (meth)acrylamide (a) to the acid group-containing unsaturated monomer (b) is preferably 40/60 to 99/1, more preferably 60/40 to 98/2, still more preferably 75/25 to 97/3, from the viewpoint of aldehyde scavenging properties.

In consideration of an aldehyde releasing object (an aldehyde source such as resin), the copolymer (A) may contain a different monomer (c) as a constituent monomer in addition to the (meth)acrylamide (a) and the monomer (b) in order to improve the aldehyde scavenging properties.

The weight of the monomer (c) based on the weight of the copolymer (A) is preferably 50% by weight or less, more preferably 40% by weight or less, still more preferably 30% by weight or less.

Examples of the different monomer (c) (also referred to as the monomer (c)) include a polyoxyalkylene group-containing (meth)acrylic acid ester (c1) (also referred to as a monomer (c1)), an alkyl group- or hydroxyalkyl group-containing C4-C30 (meth)acrylic acid alkyl ester (c2) (also referred to as a monomer (c2)), and (meth)acrylonitrile. The monomer (c) may be used alone, or two or more thereof may be used. The number of carbon atoms of the monomer (c2), 4 to 30, is the number of carbon atoms of the whole compound including the alkyl group or the hydroxyalkyl group.

The copolymer (A) can further contain, as a constituent monomer, at least one monomer (c) selected from the group consisting of a polyoxyalkylene group-containing (meth) acrylic acid ester (Cl) and an alkyl group- or hydroxyalkyl group-containing C4-C30 (meth)acrylic acid alkyl ester (c2). In one embodiment of the present invention, when the aldehyde scavenger of the present invention is used in a polyacetal resin, the copolymer (A) preferably contains the monomer (c1) as a constituent unit. When the aldehyde scavenger of the present invention is used in a polyolefin resin, the copolymer (A) preferably contains the monomer (c2) as a constituent unit, for example.

The polyoxyalkylene group in the polyoxyalkylene group-containing (meth)acrylic acid ester (c1) is preferably a polyoxyalkylene group containing a C2-C3 alkylene, more preferably a C2 alkylene, and having the number of moles of added oxyalkylene groups of 2 to 100 (preferably 3 to 50, more preferably 5 to 20). The (meth)acrylic acid ester (c1) preferably has an average number of moles of added oxyalkylene groups of 2 to 100, more preferably 3 to 50, still more preferably 5 to 20. The oxyalkylene groups in the polyoxyalkylene group are preferably oxyethylene and/or oxypropylene group(s), more preferably oxyethylene group. The monomer (c1) is preferably a polyoxyethylene group-containing (meth)acrylic acid ester. A preferred example thereof is methoxy polyethylene glycol mono(meth)acrylate.

Examples of the alkyl group- or hydroxyalkyl group-containing C4-C30 (meth)acrylic acid alkyl ester (c2) include: C4-C30 (meth)acrylic acid alkyl (the alkyl group preferably has 1 to 24 carbon atoms, more preferably 2 to 18 carbon atoms) esters (e.g., methyl (meth)acrylate, ethyl (meth)acrylate, 2-ethylhexyl (meth)acrylate, dodecyl (meth) acrylate, octadecyl (meth)acrylate, and 2-decyltetradecyl (meth)acrylate); and (meth)acrylic acid hydroxyalkyl (the alkyl group preferably has 2 to 10 carbon atoms) esters (e.g., 2-hydroxyethyl (meth)acrylate). Preferred examples of the monomer (c2) include dodecyl (meth)acrylate, 2-hydroxyethyl (meth)acrylate, 2-ethylhexyl (meth)acrylate, octadecyl (meth)acrylate, and 2-decyltetradecyl (meth)acrylate, with dodecyl (meth)acrylate, octadecyl (meth)acrylate, and 2-hydroxyethyl (meth)acrylate being more preferred.

The copolymer (A) preferably has a weight average molecular weight (hereinafter abbreviated to Mw, which is measured by gel permeation chromatography (GPO) described below) of 2,000 to 100,000, more preferably 4,000 to 70,000, still more preferably 6,000 to 50,000, from the viewpoint of the balance between the aldehyde scavenging properties and the moldability (mold fouling resistance).

The weight average molecular weight (Mw) and number average molecular weight (Mn) in the present invention are determined by GPC measurement under the following conditions.

<GPC Measurement Conditions>

(1) Device: Gel permeation chromatograph (Model No.: HLC-8120GPC, available from Tosoh Corp.)

(2) Columns: "TSKgel G6000PWx1" and "TSKgel G3000PWx1" (both available from Tosoh Corp.) connected in series (3) Eluent: prepared by dissolving 0.5% by weight of sodium acetate in methanol/water=30/70 (volume ratio)

(4) Reference material: polyethylene glycol (hereinafter sometimes abbreviated to PEG)

(5) Injection conditions: sample concentration of 0.25% by weight, column temperature of 40° C.

The copolymer (A) can be produced by known polymerization methods, for example, solution polymerization. From the viewpoint of productivity, solution polymerization, which is performed in a solvent (water and/or organic solvent), is preferred.

For example, a monomer containing the (meth)acrylamide (a) and the monomer (b) is polymerized in a solvent using a polymerization initiator, optionally in the presence of a chain transfer agent. Examples of the solvent include water and organic solvents.

Examples of the organic solvents include aqueous solvents (having a solubility in water at 25° C. of 10 g or more/100 g of water) such as ketones (e.g., acetone, methyl ethyl ketone (hereinafter abbreviated to MEN), and diethyl ketone) and alcohols (e.g., methanol, ethanol, and isopropyl alcohol). From the viewpoint of productivity, acetone, MEK, and isopropyl alcohol are preferred. One or more of the organic solvents can be used.

The copolymer (A) is preferably produced in the form of a solution containing the copolymer (A) or a solid containing the copolymer (A). When the copolymer (A) is produced in the form of a solution, the amount (% by weight) of the copolymer (A) in the solution is preferably 5 to 80% by weight, more preferably 10 to 70% by weight, still more preferably 20 to 60% by weight, from the viewpoint of productivity and post-process handling. When the copolymer (A) is produced in the form of a solid, the amount (% by weight) of the copolymer (A) in the solid is preferably 70 to 100% by weight, more preferably 80 to 100% by weight, still more preferably 90 to 100% by weight, from the viewpoint of productivity and post-process handling.

Polymerization initiators generate active species such as radicals through heat or light.

The polymerization initiator in the present invention may be a known polymerization initiator. Examples thereof include azo compounds (e.g., azobisisobutyronitrile and 2,2'-azobis(2-methylbutyronitrile)) and peroxides.

The copolymer (A) is preferably produced at a polymerization temperature of 0° C. to 200° C., more preferably 40° C. to 150° C., from the viewpoint of productivity and control of the molecular weight of the copolymer (A).

The duration of the polymerization is preferably 1 to 10 hours, more preferably 2 to 8 hours, from the viewpoint of productivity and reducing the residual monomer content of the product.

The end point of the polymerization reaction can be confirmed by the residual monomer content. The residual monomer content is preferably 5% by weight or less, more preferably 3% by weight or less, based on the weight of the copolymer (A) from the viewpoint of the mechanical strength and moldability (mold fouling resistance) of the molded article. The residual monomer content can be measured by gas chromatography.

The copolymer (A) preferably has an acid value (unit: mg KOH/g) of 5 to 180, more preferably 10 to 100, from the viewpoint of aldehyde scavenging properties.

The acid value can be determined by potentiometric titration, which is the method specified in JIS K 0070:1992.

<(Co)polymer (B)>

The (co)polymer (B) in the present invention contains the (meth)acrylamide (a) as a constituent monomer but does not contain the acid group-containing unsaturated monomer (b) as a constituent monomer.

The term "(co)polymer" means "polymer" or "copolymer".

The amount of the (meth)acrylamide (a) based on the weight of the (co)polymer (B) is preferably 50 to 100% by weight, more preferably 60 to 90% by weight, still more preferably 70 to 85% by weight.

In consideration of an aldehyde releasing object (e.g., resin), the (co)polymer (B) may contain the different monomer (c) as a constituent monomer in addition to the (meth) acrylamide (a) in order to improve the aldehyde scavenging properties.

In this case, the weight of the monomer (c) based on the weight of the (co)polymer (B) is preferably 50% by weight or less, more preferably 40% by weight or less, still more preferably 30% by weight or less.

The (co)polymer (B) preferably has a weight average molecular weight (measured by the gel permeation chromatography (GPO) described above) of 2,000 and 100,000, more preferably 4,000 to 70,000, still more preferably 6,000 to 50,000, from the viewpoint of the balance between the aldehyde scavenging properties and the moldability (mold fouling resistance).

The (co)polymer (B) can be produced by the same method as for the copolymer (A) using the above-described monomers.

The (co)polymer (B) is preferably produced in the form of a solution containing the (co)polymer (B) or a solid containing the (co)polymer (B). When the (co)polymer (B) is produced in the form of a solution, the amount (% by weight) of the (co)polymer (B) in the solution is preferably 5 to 80% by weight, more preferably 10 to 70% by weight, still more preferably 20 to 60% by weight, from the viewpoint of productivity and post-process handling. When the (co)polymer (B) is produced in the form of a solid, the amount (% by weight) of the (co)polymer (B) in the solid is preferably 70 to 100% by weight, more preferably 80 to 100% by weight, still more preferably 90 to 100% by weight, from the viewpoint of productivity and post-process handling.

<(Co)polymer (C)>

The (co)polymer (C) in the present invention contains the acid group-containing unsaturated monomer (b) as a constituent monomer but does not contain the (meth)acrylamide (a) as a constituent monomer.

The amount of the acid group-containing unsaturated monomer (b) based on the weight of the (co)polymer (C) is preferably 5 to 90% by weight, more preferably 10 to 85% by weight, still more preferably 20 to 80% by weight.

In consideration of an aldehyde releasing object (e.g., resin), the (co)polymer (C) may contain the different monomer (c) as a constituent monomer in addition to the monomer (b) in order to improve the aldehyde scavenging properties.

The weight of the monomer (c) based on the weight of the (co)polymer (C) is preferably 10 to 95% by weight, more preferably 15 to 90% by weight, still more preferably 20 to 80% by weight.

The (co)polymer (C) preferably has an acid value (unit: mg KOH/g) of 20 to 720, more preferably 60 to 680, still more preferably 120 to 650, from the viewpoint of aldehyde scavenging properties.

The (co)polymer (C) preferably has a weight average molecular weight (measured by the gel permeation chromatography (GPC) described above) of 2,000 and 100,000, more preferably 4,000 to 70,000, still more preferably 6,000 to 50,000, from the viewpoint of the balance between the aldehyde scavenging properties and the moldability (mold fouling resistance).

The (co)polymer (C) can be produced by the same method as for the copolymer (A) using the above-described monomers.

The (co)polymer (C) is preferably produced in the form of a solution containing the (co)polymer (C) or a solid containing the (co)polymer (C). When the (co)polymer (C) is produced in the form of a solution, the amount (% by weight) of the (co)polymer (C) in the solution is preferably 5 to 80% by weight, more preferably 10 to 70% by weight, still more preferably 20 to 60% by weight, from the viewpoint of productivity and post-process handling. When the (co)polymer (C) is produced in the form of a solid, the amount (% by weight) of the (co)polymer (C) in the solid is preferably 70 to 100% by weight, more preferably 80 to 100% by weight, still more preferably 90 to 100% by weight, from the viewpoint of productivity and post-process handling.

The (co)polymer (B) and/or (co)polymer (C) may contain, as a constituent monomer, at least one monomer (c) selected from the group consisting of a polyoxyalkylene group-containing (meth)acrylic acid ester (c1) (monomer (c1)) and an alkyl group- or hydroxyalkyl group-containing C4-C30 (meth)acrylic acid alkyl ester (c2) (monomer (c2)). In one embodiment of the present invention, when the aldehyde scavenger of the present invention is used in a polyacetal resin, the (co)polymer (B) and/or (co)polymer (C) preferably contains the monomer (c1) as a constituent unit. When the aldehyde scavenger of the present invention is used in a polyolefin resin, the (co)polymer (B) and/or (co)polymer (C) preferably contains the monomer (c2) as a constituent unit, for example.

When the aldehyde scavenger contains a mixture containing the (co)polymer (B) and the (co)polymer (C), the weight ratio ((a)/(b)) of the (meth)acrylamide (a) contained in the (co)polymer (B) as a constituent monomer to the monomer (b) contained in the (co)polymer (C) as a constituent monomer is preferably 40/60 to 99/1, more preferably 60/40 to 98/2, still more preferably 75/25 to 97/3. The weight ratio ((a)/(b)) within the above range is preferred because the aldehyde scavenger has better aldehyde scavenging properties.

<Aldehyde Scavenger>

The aldehyde scavenger of the present invention scavenges aldehydes released from aldehyde sources such as resins to prevent release of the aldehydes into the environment. The aldehyde scavenger of the present invention is suitably used to scavenge aldehydes released from resins.

The aldehyde scavenger of the present invention may be an aldehyde scavenger containing the copolymer (A), an aldehyde scavenger containing the copolymer (A) and a mixture of the (co)polymer (B) and the (co)polymer (C), or an aldehyde scavenger containing a mixture of the (co) polymer (B) and the (co)polymer (C). The aldehyde scavenger may contain one or more copolymers (A), one or more (co)polymers (B), or one or more (co)polymers (C).

The aldehyde scavenger is preferably produced by desolvating a solution of the copolymer (A) or a solution of the mixture of the (co)polymer (B) and the (co)polymer (C). The (co)polymer (B) and the (co)polymer (C) may be independently desolvated before mixing. The (co)polymers (A), (B) and (C) may be used in the form of a solution without desolvating.

When the aldehyde scavenger is in the form of a solution, the weight of the solvent in the aldehyde scavenger based on the weight of the aldehyde scavenger is preferably 20 to 95% by weight, more preferably 30 to 90% by weight, still more preferably 40 to 80% by weight. When the aldehyde scavenger is in the form of a solution, the total amount of the (co)polymers (A), (B) and (C) in the aldehyde scavenger is preferably 5 to 80% by weight, more preferably 10 to 70% by weight, still more preferably 20 to 60% by weight.

The solvent may be the same as the solvent used in the production of the copolymer (A), (co)polymer (B), or (co) polymer (C).

When the aldehyde scavenger is in the form of a solid, the total amount of the (co)polymers (A), (B) and (C) is preferably 70% by weight or more, more preferably 80% by weight or more, still more preferably 90% by weight or more.

The present invention also encompasses use of the copolymer (A) and/or the (co)polymer (B) and the (co)polymer (C) in the production of the aldehyde scavenger.

When the aldehyde scavenger of the present invention contains a mixture of the (co)polymer (B) and the (co) polymer (C), the weight ratio of the (co)polymer (B) to the (co)polymer (C) ((B)/(C)) is preferably 99/1 to 1/99, more preferably 95/5 to 1/90, still more preferably 90/10 to 20/80, from the viewpoint of aldehyde scavenging properties.

The (co)polymer (B) and the (co)polymer (C) may be prepared into a solution mixture or powder blend in advance before the aldehyde scavenger of the present invention is used. Alternatively, the (co)polymer (B) and the (co)polymer (C) may be added separately to an aldehyde source.

The aldehyde scavenger can be used for various aldehydes, and is particularly suitable as aldehyde scavengers such as aldehyde scavengers for a resin (D), which is described below, containing formaldehyde as a constituent monomer, aldehyde scavengers for urethane resins, aldehyde scavengers for polyacetal resins, aldehyde scavengers for polyolefin resins, and aldehyde scavengers for polyester resins. The aldehyde scavenger is preferably used to scavenge one or more aldehydes selected from formaldehyde, acetaldehyde, propionaldehyde, butyraldehyde, pentanal, hexanal, heptanal, octanal, nonanal, decanal, acrolein, and the like, more preferably used to scavenge at least one aldehyde selected from the group consisting of formaldehyde, acetaldehyde, hexanal, heptanal, and octanal, still more preferably used to scavenge formaldehyde and/or acetaldehyde.

The copolymer (A) and/or (co)polymer (C) may contain a product of a neutralization. Specifically, one or more or all of the acid groups in each (co)polymer may be neutralized with a base (E). In other words, one or more or all of the acid groups are neutralized with the base (E) in part or all of the copolymer (A) and/or (co)polymer (C). The aldehyde scavenger of the present invention may contain a product of a neutralization of the copolymer (A) with the base (E) and/or a product of a neutralization of the (co)polymer (C) with the base (E). In this case, the product of a neutralization of the copolymer (A) and/or the (co)polymer (C) with the base (E) each preferably have a neutralization ratio of 1% to 120%, more preferably 3% to 80%, still more preferably 5% to 40%.

As for the neutralization, the acid groups may be neutralized with the base (E) before polymerization, or one or more or all of the acid groups in the copolymer (A) and/or (co)polymer (C) may be neutralized with the base (E) after polymerization.

Examples of the base (E) in the present invention include ammonia, trialkyl (the alkyls each independently have 1 to 3 carbon atoms) amines (e.g., trimethylamine, triethylamine), and alkali metal hydroxides (e.g., sodium hydroxide). One or more of these bases may be used.

Preferred among the bases (E) are ammonia and trialkyl (the alkyls each independently have 1 to 3 carbon atoms) amines, with ammonia being more preferred.

The neutralization ratio of the product of a neutralization of the copolymer (A) and/or the (co)polymer (C) with the base (E) means the percentage of the number of moles of the base (E) to the total number of moles of the acid groups in the copolymer (A) and/or (co)polymer (C) (100× number of moles of base (E)/total number of moles of acid groups) (mol %). The neutralization ratio of the product of a neutralization of the copolymer (A) with the base (E) can be calculated from the sum of the acid values (unit: mg KOH/g) of the copolymer (A), the weight of the copolymer (A), the base value (alkali value) (unit: mg KOH/g) of the base (E), and the weight of the base (E). The neutralization ratio of the product of a neutralization of the (co)polymer (C) with the base (E) can be calculated from the sum of the acid values (unit: mg KOH/g) of the (co)polymer (C), the weight of the (co)polymer (C), the base value (alkali value) (unit: mg KOH/g) of the base (E), and the weight of the base (E). The neutralization ratio of the product of a neutralization of the copolymer (A) with the base (E) and the product of a neutralization of the (co)polymer (C) with the base (E) can be calculated from the sum of the acid values (unit: mg KOH/g) of the copolymer (A) and the (co)polymer (C), the weight of the copolymer (A) and the (co)polymer (C), the base value (alkali value) (unit: mg KOH/g) of the base (E), and the weight of the base (E).

When the acid group is a carboxylic anhydride group, one acid anhydride group is observed as an equivalent of one carboxyl group in a determination of the acid value. Thus, the obtained acid value is multiplied by two to calculate the neutralization ratio.

<Resin (D) Containing Formaldehyde as Constituent Monomer>

The resin (D) containing formaldehyde as a constituent monomer in the present invention is a resin containing formaldehyde and at least one monomer selected from the group consisting of phenols, resorcinol, urea, and melamine as constituent monomers.

The resin (D) includes at least one selected from the group consisting of phenolic resins, urea resins, melamine resins, and urea-melamine resins, for example.

Phenolic Resins

Examples of phenolic resins include reaction products of formaldehyde and phenol, cresol, xylenol, or resorcinol (preferably phenol).

Urea Resins

An example of urea resins is a reaction product of urea and formaldehyde.

Melamine Resins

An example of melamine resins is a reaction product of melamine and formaldehyde.

Urea-Melamine Resins

An example of urea-melamine resins is a reaction product of urea, melamine, and formaldehyde.

<Urethane Resin>

The urethane resins in the present invention may be known urethane resins and can be produced by reacting a constituent raw material containing polyisocyanate, polyol, and optionally a blowing agent and a catalyst.

The urethane resins in the present invention may be foams or non-foams. Examples of the foams (polyurethane foams) include rigid urethane foams and flexible urethane foams. The polyurethane foam has a foam density ($kg/m^3$) of 15 to 45, for example.

<Polyacetal Resin>

Examples of the polyacetal resins in the present invention include known polyacetal resins and polymers containing oxymethylene and optionally oxyethylene as structure units.

Examples of commercially available polyacetal include Delrin® (DuPont) and DURACON® (Polyplastics Co., Ltd.).

<Polyolefin Resin>

The polyolefin resins in the present invention are polymers with crystallinity obtainable by polymerization of α-olefins having a double bond at position 1, such as polyethylene, polypropylene, polybutene, and polyisobutylene. In the present invention, recycled polyolefin may be used. Recycled polyolefin is a generic term for polyolefins recovered as pre-consumer products, such as waste or defective products from the process of molding articles from virgin pellets, or as waste plastics such as plastic containers and packaging for recycling (so-called "plastic for recycling") after they have been marketed and consumed as molded articles on the market.

<Polyester Resin>

The polyester resins in the present invention may be known polyester resins, and examples thereof include resins containing polycarboxylic acids and polyhydric alcohols as constituent monomers. Specific examples of the polyester resins include polyethylene terephthalate, polytrimethylene terephthalate, polybutylene terephthalate, polyethylene naphthalate, and polybutylene naphthalate.

The resin composition of the present invention contains the aldehyde scavenger and at least one resin selected from the group consisting of polyester resins, polyacetal resins, polyolefin resins, phenolic resins, urethane resins, melamine resins, urea resins, and urea-melamine resins. Preferably, the resin composition contains at least one selected from the group consisting of polyacetal resins, polyolefin resins, phenolic resins, urethane resins, melamine resins, and urea-melamine resins.

An aldehyde scavenger (X) may be added before or during the production of the resin. Alternatively, the aldehyde scavenger (X) may be added to the resin produced.

When the aldehyde scavenger (X) contains the copolymer (A), the aldehyde scavenger (X) is used in such an amount that the weight ratio of the copolymer (A) is preferably 0.05 to 50, more preferably 0.1 to 30 relative to 100 of the resin. When the aldehyde scavenger (X) contains the (co)polymer (B) and the (co)polymer (C), the aldehyde scavenger (X) is used in such an amount that the weight ratio of a sum of the (co)polymer (B) and the (co)polymer (C) is preferably 0.05 to 50, more preferably 0.1 to 30 relative to 100 of the resin.

The resin composition of the present invention may contain the aldehyde scavenger, any of the above-mentioned resins, and optionally other additives for resins (e.g., antioxidants, compatibilizers). The resin composition of the present invention may optionally contain elastomer components, talc, glass fiber, cellulose nanofibers, and the like.

The aldehyde scavenger of the present invention has excellent aldehyde scavenging properties. Addition of the aldehyde scavenger to resins can also improve the moldability (mold fouling resistance) of the resins. The aldehyde scavenging properties can be evaluated using (1) the amount of aldehydes scavenged and (2) the aldehyde scavenging efficiency (in the case of a liquid sample, the evaluation can be performed at low temperature (e.g., 20° C. to 50° C.) or at low aldehyde concentration, and in the case of a resin sample, the evaluation can be performed at high temperature condition (e.g., 100° C. to 230° C.) such as melt kneading temperature or molding temperature). The evaluations in the examples described below show that the total performance of (1) and (2) is excellent. The resin composition containing the aldehyde scavenger of the present invention also has excellent moldability (mold fouling resistance).

Herein, a method of inhibiting the release of aldehydes from a resin mentioned below is also described.

The method of inhibiting the release of aldehydes from a resin includes adding the copolymer (A) and/or the (co) polymer (B) and the (co)polymer (C) to a resin or a raw material of the resin.

The copolymer (A) and/or the (co)polymer (B) and the (co)polymer (C) may be added to a resin. Alternatively, these copolymers may be added to a raw material of the resin before or during production of the resin. When the (co) polymer (B) and the (co)polymer (C) are used, a mixture of the (co)polymer (B) and the (co)polymer (C) may be added, or the (co)polymer (B) and the (co)polymer (C) may be added separately. Examples of the resin include the resins described above. The resin preferably includes at least one resin selected from the group consisting of polyester resins, polyacetal resins, polyolefin resins, phenolic resins, urethane resins, melamine resins, urea resins, and urea-melamine resins.

EXAMPLES

The present invention is described in more detail below with reference to examples, but the present invention is not limited thereto.

The following lists the formulations, symbols, and the like of the raw materials used in the examples and comparative examples.

<(Meth)acrylamide (a)>

(a-1): acrylamide (Mitsui Chemicals, Inc.)

<Monomer (b)>

(b1-1): acrylic acid (b1-2): mono(2-acryloyloxyethyl) succinate (Tokyo Chemical Industry Co., Ltd.)

<Other Monomer (c)>

(c1-1): methoxypolyethylene glycol monoacrylate (average number of moles of oxyethylene added: 9)

(c2-1): 2-hydroxyethyl acrylate (c2-2): dodecyl methacrylate

<Polymerization Initiator>

AIBN: azobisisobutyronitrile

V-59: 2,2'-azobis(2-methylbutyronitrile)

<Organic Solvent>

IPA: isopropyl alcohol

The acid value was determined by potentiometric titration, which is the method specified in JIS K 0070:1992.

Example 1

A monomer solution was obtained by preparing, at room temperature, a solution mixture containing 472 parts by weight of a 40% by weight aqueous solution of acrylamide (a-1) ((a-1) content: 189 parts by weight), 21 parts by weight of acrylic acid (b1-1), 2.0 parts by weight of mercaptopropionic acid, and 200 parts by weight of IPA.

Separately, a polymerization initiator solution was obtained by homogeneously dissolving, at room temperature, 2.0 parts by weight of AIBN in 103 parts by weight of IPA.

A glass reaction vessel (polymerization tank) equipped with a drop inlet, a reflux tube, and a stirring blade was charged with 200 parts by weight of IPA. The contents were heated to 82° C. and refluxed under stirring at 200 rpm. Under reflux conditions and atmospheric pressure, the monomer solution and the polymerization initiator solution were each all added to the vessel over 180 minutes. After the addition, the contents were polymerized for 180 minutes under atmospheric pressure reflux with continuous stirring.

After the polymerization, the contents were transferred to a recovery flask, and IPA and water were removed at 60° C. using an evaporator. Then, ion-exchange water was added to adjust the concentration of solids to 50% by weight to obtain an aldehyde scavenger (X-1) containing a copolymer (A-1).

Examples 2 to 7 and 12

Aldehyde scavengers (X-2) to (X-7) and (X-12) containing copolymers (A-2) to (A-7) and (A-12), respectively, were obtained as in Example 1 in accordance with the raw material formulation shown in Table 1. In Examples 5, 7, and 12 for the aldehyde scavengers (X-5), (X-7), and (X-12), after removal of solvents, ammonia water (concentration: 25% by weight) was added, followed by addition of ion-exchange water to adjust the concentration.

Example 8

Polymerization was performed as in Example 1 in accordance with the raw material formulation (parts by weight) shown in Table 1. After the polymerization, the contents were transferred to a recovery flask, and IPA was removed at 60° C. using an evaporator until the IPA odor was eliminated. The contents remaining in the recovery flask were all transferred to a stainless steel vat and dried using a circulation dryer at 100° C. for about six hours while appropriately mixing the contents with a spatula. The dried product was ground in a table mill to obtain an aldehyde scavenger (X-8) containing 98.2% by weight of a copolymer (A-8). The copolymer (A-8) had an acid value (mg KOH/g) of 39.1. The amount of the copolymer (A) (in terms of solid concentration) in the aldehyde scavenger (X) was determined as follows: the weights (x1) and (x2) of the aldehyde scavenger (X) before drying and after drying using a circulation dryer (130° C., 90 minutes), respectively, were determined; and the copolymer (A) content (100×x2/ x1) was calculated using the weights (x1) and (x2). The same procedures were performed in the following examples.

Examples 9 to 11

Aldehyde scavengers (X-9) to (X-11) were obtained as in Example 8 in accordance with the raw material formulation shown in Table 1.

TABLE 1

| | | | Example | | | | | | |
|---|---|---|---|---|---|---|---|---|---|
| | | | 1 | 2 | 3 | 4 | 5 | 6 | 7 |
| Aldehyde scavenger | | | X-1 | X-2 | X-3 | X-4 | X-5 | X-6 | X-7 |
| Copolymer | | | A-1 | A-2 | A-3 | A-4 | A-5 | A-6 | A-7 |
| Raw material formulation (parts by weight) | Monomer solution | (a-1) 40% aqueous solution | 472 | 499 | 420 | 472 | 357 | 263 | 494 |
| | | (a-1) 50% aqueous solution | | | | | | | |
| | | (a-1) content | 189 | 200 | 168 | 189 | 143 | 105 | 198 |
| | | (b1-1) | 21 | 11 | 42 | 21 | 15 | 21 | 13 |
| | | (b1-2) | | | | | | | |
| | | (c1-1) | | | | | 53 | 84 | |
| | | (c2-1) | | | | | | | 38 |
| | | (c2-2) | | | | | | | |
| | | Mercaptopropionic acid | 2.0 | | 1.0 | | 2.0 | 1.0 | |
| | | IPA | 200 | 200 | 200 | 200 | 200 | 200 | 200 |
| | Polymerization initiator solution | AIBN | 2.0 | 2.0 | 2.0 | 2.0 | 2.0 | 2.0 | 2.0 |
| | | V-59 | | | | | | | |
| | | IPA | 103 | 103 | 103 | 103 | 103 | 103 | 103 |
| | Polymerization tank | IPA | 200 | 200 | 200 | 200 | 200 | 200 | 200 |

TABLE 1-continued

| | | | | | | | | |
|---|---|---|---|---|---|---|---|---|
| | Ammonia water (25% by weight) | | | | | 10 | | 3 |
| Properties of (A) | Mw | 7000 | 12000 | 6000 | 11000 | 7500 | 10000 | 16000 |
| | Solid concentration (%) | 50 | 50 | 50 | 50 | 50 | 50 | 50 |
| | Weight ratio [(a)/(b)] | 90/10 | 95/5 | 80/20 | 90/10 | 90/10 | 83/17 | 94/6 |
| | Neutralization ratio (%) | — | — | — | — | 65 | — | 24 |
| | Acid value (mgKOH/g) | 81.7 | 40.4 | 156.5 | 77.4 | 59.5 | 79.4 | 40.5 |

| | | | Example | | | | |
|---|---|---|---|---|---|---|---|
| | | | 8 | 9 | 10 | 11 | 12 |
| Aldehyde scavenger | | | X-8 | X-9 | X-10 | X-11 | X-12 |
| Copolymer | | | A-8 | A-9 | A-10 | A-11 | A-12 |
| Raw material formulation (parts by weight) | Monomer solution | (a-1) 40% aqueous solution | 688 | 525 | 263 | | 494 |
| | | (a-1) 50% aqueous solution | | | | 450 | |
| | | (a-1) content | 275 | 210 | 105 | 225 | 198 |
| | | (b1-1) | 18 | 15 | | 15 | 13 |
| | | (b1-2) | | | 135 | | |
| | | (c1-1) | 73 | 75 | 60 | | |
| | | (c2-1) | | | | | 38 |
| | | (c2-2) | | | | 60 | |
| | | Mercaptopropionic acid | 0.4 | | 3.0 | 1.5 | |
| | | IPA | | 50 | 50 | 350 | 200 |
| | Polymerization initiator solution | AIBN | | 0.9 | | | 2.0 |
| | | V-59 | 3.7 | | 3.0 | 3.0 | |
| | | IPA | 106 | 150 | 150 | 100 | 103 |
| | Polymerization tank | IPA | 110 | 150 | 150 | 100 | 200 |
| | Ammonia water (25% by weight) | | | | | | 13 |
| Properties of (A) | Mw | | 11000 | 80000 | 7100 | 12000 | 16000 |
| | Solid concentration (%) | | 98.2 | 98.1 | 98 | 98.6 | 50 |
| | Weight ratio [(a)/(b)] | | 94/6 | 93/7 | 44/56 | 94/6 | 94/6 |
| | Neutralization ratio (%) | | — | — | — | — | 106 |
| | Acid value (mgKOH/g) | | 39.1 | 38.9 | 120.0 | 41.1 | 40.5 |

Production Example 1

A monomer solution was obtained by preparing, at room temperature, a solution mixture containing 714 parts by weight of a 40% by weight aqueous solution of acrylamide (a-1) ((a-1) content: 286 parts by weight), 71 parts by weight of methoxypolyethylene glycol monoacrylate (number of moles of oxyethylene added of 9) (c1-1), and 0.4 parts by weight of mercaptopropionic acid.

Separately, a polymerization initiator solution was obtained by homogeneously dissolving, at room temperature, 3.6 parts by weight of V-59 in 104 parts by weight of IPA.

A glass reaction vessel (polymerization tank) equipped with a drop inlet, a reflux tube, and a stirring blade was charged with 107 parts by weight of IPA. The contents were heated to 82° C. and refluxed under stirring at 200 rpm. Under reflux conditions and atmospheric pressure, the monomer solution and the polymerization initiator solution were each all added to the vessel over 180 minutes. After the addition, the contents were polymerized under atmospheric pressure reflux for 180 minutes with continuous stirring.

After the polymerization, the contents were transferred to a recovery flask, and IPA and water were removed at 60° C. using an evaporator. The contents remaining in the recovery flask were all transferred to a stainless steel vat and dried using a circulation dryer at 100° C. for about six hours while appropriately mixing the contents with a spatula. The resulting dry material was ground in a table mill to obtain a powder (BX-1) containing 97.8% by weight of a (co) polymer (B-1).

Production Examples 2 to 5

Powders (BX-2) and (CX-1) to (CX-3) containing (co) polymers (B-2) and (C-1) to (C-3), respectively, were obtained as in Production Example 1 in accordance with the raw material formulation shown in Table 2.

TABLE 2

| | | | Production Example | | | | |
|---|---|---|---|---|---|---|---|
| | | | 1 | 2 | 3 | 4 | 5 |
| Copolymer | | | B-1 | B-2 | C-1 | C-2 | C-3 |
| Raw material formulation (parts by weight) | Monomer solution | (a-1) 40% aqueous solution | 714 | | | | |
| | | (a-1) 50% aqueous solution | | 480 | | | |
| | | (a-1) content | 286 | 240 | 0 | 0 | 0 |
| | | (b1-1) | | | 320 | 80 | 240 |
| | | (d-1) | 71 | | 80 | 320 | |
| | | (c2-2) | | 60 | | | 160 |
| | | Mercaptopropionic acid | 0.4 | 1.0 | 4.0 | 4.0 | 2.0 |
| | | IPA | | 350 | 50 | 50 | 200 |
| | | Ion-exchange water | | | 150 | 150 | |
| | Polymerization initiator solution | V-59 | 3.6 | 3.0 | 4.0 | 4.0 | 4.0 |
| | | IPA | 104 | 100 | 150 | 150 | 150 |
| | Polymerization tank | IPA | 107 | 100 | 150 | 150 | 200 |
| | | Ion-exchange water | | | 50 | 50 | |
| Properties of (B) and (C) | Mw | | 10500 | 13000 | 17000 | 13000 | 14000 |
| | Solid concentration (%) | | 97.8 | 98.4 | 98.0 | 97.2 | 98.1 |
| | Weight ratio [(a)/(b)] | | 100/0 | 100/0 | 0/100 | 0/100 | 0/100 |
| | Acid value (mgKOH/g) | | 0.5 | 1.7 | 618 | 158 | 464 |

Examples 13 to 15

In accordance with the formulation shown in Table 3, aldehyde scavengers (X-13) to (X-15) were obtained by powder blending any of powders (BX-1) and (BX-2) and (CX-1) to (CX-3) containing copolymers (B-1) and (B-2) and (C-1) to (C-3), respectively.

TABLE 3

| | | Example | | |
|---|---|---|---|---|
| | | 13 | 14 | 15 |
| Aldehyde scavenger | | X-13 | X-14 | X-15 |
| Raw material formulation (parts by weight | (B-1) | 90 | 40 | |
| | (B-2) | | | 90 |
| | (C-1) | 10 | | |
| | (C-2) | | 60 | |
| | (C-3) | | | 10 |

The obtained aldehyde scavengers (X-1) to (X-15) were evaluated by the evaluation method described below. For comparison, adipic acid dihydrazide was used as it is as an aldehyde scavenger (Comparative X-1).

Comparative Production Example 1

A beaker was charged with 70 parts by weight of polyacrylamide (Sigma-Aldrich, Mn=40000) and 30 parts by weight of polyethylene glycol (PEG-400, Mn=400, available from Sanyo Chemical Industries, Ltd.). The contents were mixed with a spatula until a homogeneous mixture was obtained. Thus, an aldehyde scavenger (Comparative X-2) for comparison was obtained.

Examples 21 to 28 and Comparative Example 21

Evaluation Method

<1> Scavenging Properties in Aqueous Urea-Melamine Resin Solution

<1-1> Synthesis of Urea-Melamine Resin

A reaction vessel was charged with 50 parts by weight of urea, 62 parts by weight of melamine, 220 parts by weight of a 37% by weight aqueous formaldehyde solution, and 14.0 parts by weight of methanol. The contents were stirred at 25° C.

Another vessel was charged with 144 parts by weight of ion-exchange water and 3.0 parts by weight of sodium hydroxide to prepare an aqueous sodium hydroxide solution.

The entire sodium hydroxide solution was added to the reaction vessel. The contents were stirred at 90° C. for two hours and cooled to room temperature to obtain an aqueous urea-melamine resin solution (40% by weight concentration). The concentration of free formaldehyde in the aqueous resin solution was 3% by weight.

<1-2> Scavenging Properties in Aqueous Solution

In accordance with the compounding formulation shown in Table 4, a solution mixture containing 100 parts by weight of the aqueous urea-melamine resin solution and 15 parts by weight of any of the aldehyde scavengers (X-1) to (X-7) and (X-12) or 7.5 parts by weight of the aldehyde scavenger (Comparative X-1) was mixed at 40° C. for three hours with stirring. The formaldehyde content of the aqueous solution after mixing was determined according to determination of free formaldehyde content in JIS K 6807. The results of determination of free formaldehyde content (% by weight) of the aqueous solution are shown in Table 4.

TABLE 4

| | | | Example | | | | | | | | Comparative Example |
|---|---|---|---|---|---|---|---|---|---|---|---|
| | | | 21 | 22 | 23 | 24 | 25 | 26 | 27 | 28 | 21 |
| Compounding formulation (parts by weight) | Aldehyde scavenger | X-1 | 15 | | | | | | | | |
| | | X-2 | | 15 | | | | | | | |
| | | X-3 | | | 15 | | | | | | |
| | | X-4 | | | | 15 | | | | | |
| | | X-5 | | | | | 15 | | | | |
| | | X-6 | | | | | | 15 | | | |
| | | X-7 | | | | | | | 15 | | |
| | | X-12 | | | | | | | | 15 | |
| | | Comparative X-1 | | | | | | | | | 7.5 |
| | Aqueous urea-melamine resin solution | | 100 | 100 | 100 | 100 | 100 | 100 | 100 | 100 | 100 |
| Evaluation | Free formaldehyde content (% by weight) of aqueous solution | | 0.50 | 0.80 | 0.65 | 0.52 | 0.70 | 0.94 | 0.86 | 0.87 | 3.2 |

Examples 31 to 38 and Comparative Example 31

<2> Scavenging Properties in Phenolic Resin

<2-1> Production of Phenolic Resin Cured Product

A reaction vessel was charged with 100 parts by weight of phenol and 250 parts by weight of a 30% by weight aqueous formaldehyde solution. The contents were stirred at 25° C.

To the reaction vessel was added 8.0 parts by weight of a 50% by weight aqueous sodium hydroxide solution. The contents were stirred at 65° C. for three hours and cooled to room temperature. Additionally, 89.5 parts by weight of ion-exchange water was added to obtain an aqueous phenolic resin solution (phenolic resin content: 40% by weight).

In accordance with the compounding formulation shown in Table 5, 100 parts by weight of the aqueous phenolic resin solution, 4 parts by weight of any of the aldehyde scavengers (X-1) to (X-7) and (X-12) or 2 parts by weight of the aldehyde scavenger (Comparative X-1), and ion-exchange water were mixed to prepare a 20% by weight phenolic resin solution mixture. A filter paper corresponding to a 5C filter paper was impregnated with the solution mixture, and reaction was performed at 180° C. for five minutes to obtain a filter paper specimen containing a phenolic resin cured product.

<2-2> Amount of Aldehyde Released

First, 100 mL of distilled water and the prepared filter paper specimen (100 mm×100 mm) were sealed in a glass desiccator (desiccator plate: 240 mm in diameter) and allowed to stand at 20° C. for 24 hours. The amount of formaldehyde dissolved in the distilled water was measured spectrophotometrically to determine an amount of aldehydes released (mg/L). The results are shown in Table 5.

<2-3> Tensile Strength

The filter paper specimen was cut into a 50 mm×20 mm piece, which was subjected to measurement of tensile strength using an autograph (AGS-500D available from Shimadzu Corp.) at a speed of 10 mm/min.

The results are shown in Table 5. The tensile strength in the case where no aldehyde scavenger (X) was added was 9.4 N.

<2-4> Moldability (Mold Fouling Resistance)

Each of the 20% phenolic resin solution mixtures containing the aldehyde scavenger obtained in <2-1> was dehydrated to obtain a phenolic resin mixture (resin composition). The resulting phenolic resin mixture was applied to a SUS420J2 test piece and reacted at 180° C. for five minutes to obtain a phenolic resin cured product, which was peeled off. This process was performed 20 times consecutively. The condition of the surface of the test piece was observed and evaluated using the following <Evaluation criteria>. The results are shown in Table 5.

<Evaluation Criteria>

- Excellent: No deposits are on the surface of the test piece at all.
- Good: Almost no deposits are on the surface of the test piece.
- Fair: A small amount of deposits are on the surface of the test piece.
- Poor: A large amount of deposits are on the surface of the test piece.

The resin compositions obtained in Examples 31 to 38 had better moldability (mold fouling resistance) than the resin composition obtained in Comparative Example 31.

TABLE 5

| | | | Example | | | | | | | | Comparative Example |
|---|---|---|---|---|---|---|---|---|---|---|---|
| | | | 31 | 32 | 33 | 34 | 35 | 36 | 37 | 38 | 31 |
| Compounding formulation (parts by weight) | Aldehyde scavenger | X-1 | 4 | | | | | | | | |
| | | X-2 | | 4 | | | | | | | |
| | | X-3 | | | 4 | | | | | | |
| | | X-4 | | | | 4 | | | | | |
| | | X-5 | | | | | 4 | | | | |
| | | X-6 | | | | | | 4 | | | |
| | | X-7 | | | | | | | 4 | | |
| | | X-12 | | | | | | | | 4 | |

TABLE 5-continued

| | | Example | | | | | | | | Comparative Example |
|---|---|---|---|---|---|---|---|---|---|---|
| | | 31 | 32 | 33 | 34 | 35 | 36 | 37 | 38 | 31 |
| | Comparative X-1 | | | | | | | | | 2 |
| | Ion-exchange water | 96 | 96 | 96 | 96 | 96 | 96 | 96 | 96 | 98 |
| | Aqueous phenolic resin solution | 100 | 100 | 100 | 100 | 100 | 100 | 100 | 100 | 100 |
| Evaluation | Amount of formaldehyde released (mg/L) | 0.38 | 0.66 | 0.49 | 0.37 | 0.65 | 0.68 | 0.55 | 0.55 | 0.85 |
| | Mold fouling resistance | Excel-lent | Excel-lent | Excel-lent | Excel-lent | Excel-lent | Excel lent | Excel-lent | Excel-lent | Fair |
| | Tensile strength (N) | 11.5 | 10.8 | 10.5 | 11.2 | 10.4 | 10.6 | 11.0 | 11.1 | 8.2 |

Examples 41 to 48 and Comparative Example 41

<3> Scavenging Properties in Wooden Board

<3-1> Production of Wooden Board

First, 100 parts by weight of particleboard lauan chips (weight average particle size: about 1.5 mm) dried for six hours using a circulation dryer at 130° C. were cooled to room temperature (25° C.)

Next, in accordance with the compounding formulation shown in Table 6, 100 parts by weight of the chips obtained were mixed by stirring with a solution mixture containing 5 parts by weight of Oshika Resin MG-200 (melamine resin solution, available from Oshika Corporation) and 0.3 parts by weight of any of the aldehyde scavengers (X-1) to (X-7) and (X-12) or 0.15 parts by weight of the aldehyde scavenger (Comparative X-1).

The mixture was thermally compressed at 130° C. and at 25 kgf/cm$^2$ for 1.5 minutes using an SKD11 metal plate to produce a wooden board having a specific gravity of 0.7 and a thickness of 3 mm.

<3-2> Moldability (Mold Fouling Resistance)

The above-described production of the wooden board by thermal compression was performed 50 times consecutively. The condition of the surface of the SKD11 metal plate was observed and evaluated using the following <Evaluation criteria>. The results are shown in Table 6.

<Evaluation Criteria>

Excellent: No deposits are on the metal plate surface at all.

Good: Almost no deposits are on the metal plate surface.

Fair: A small amount of deposits are on the metal plate surface.

Poor: A large amount of deposits are on the metal plate surface.

The moldability during the production of the wooden board was better when any of the mixtures obtained in Examples 41 to 48 (compositions each containing melamine resin and any of the aldehyde scavengers (X)) was used than when the mixture obtained in Comparative Example 41 (composition containing melamine resin and the aldehyde scavenger (Comparative X-1)) was used.

<3-3> Amount of Formaldehyde Released

A 100 mm×100 mm molded specimen was cut from the wooden board. First, 50 mL of distilled water and the prepared molded specimen (100 mm×100 mm×3 mm) were sealed in a glass desiccator (desiccator plate: 240 mm in diameter) and allowed to stand at 30° C. for 24 hours. The amount of formaldehyde dissolved in the distilled water was measured spectrophotometrically to determine an amount of formaldehyde released (unit: mg/L). The results are shown in Table 6.

<3-4> Flexural Strength of Wooden Board

The flexural strength of the wooden board was measured according to the test method of JIS A 5908. The following describes the details of the test method. A 20 mm x 200 mm specimen was cut from the produced wooden board and subjected to measurement of flexural strength (N) using an autograph (AGS-500D available from Shimadzu Corp.) at a speed of 10 mm/min. The results are shown in Table 6.

The flexural strength in the case where no aldehyde scavenger (X) was added was 17.2 N.

TABLE 6

| | | | Example | | | | | | | | Comparative Example |
|---|---|---|---|---|---|---|---|---|---|---|---|
| | | | 41 | 42 | 43 | 44 | 45 | 46 | 47 | 48 | 41 |
| Compounding formulation (parts by weight) | Aldehyde scavenger | X-1 | 0.3 | | | | | | | | |
| | | X-2 | | 0.3 | | | | | | | |
| | | X-3 | | | 0.3 | | | | | | |
| | | X-4 | | | | 0.3 | | | | | |
| | | X-5 | | | | | 0.3 | | | | |
| | | X-6 | | | | | | 0.3 | | | |
| | | X-7 | | | | | | | 0.3 | | |
| | | X-12 | | | | | | | | 0.3 | |
| | | Comparative X-1 | | | | | | | | | 0.15 |
| | Oshika Resin MG-200 | | 5 | 5 | 5 | 5 | 5 | 5 | 5 | 5 | 5 |

TABLE 6-continued

| | | Example | | | | | | | | Comparative Example |
|---|---|---|---|---|---|---|---|---|---|---|
| | | 41 | 42 | 43 | 44 | 45 | 46 | 47 | 48 | 41 |
| Evaluation | Particleboard lauan chip | 100 | 100 | 100 | 100 | 100 | 100 | 100 | 100 | 100 |
| | Amount of formaldehyde released (mg/L) | 0.6 | 0.7 | 0.7 | 0.6 | 0.8 | 0.8 | 0.7 | 0.7 | 1.3 |
| | Mold fouling resistance | Excellent | Excellent | Excellent | Excellent | Excellent | Excellent | Excellent | Excellent | Poor |
| | Flexural strength (N) | 19.1 | 18.2 | 17.8 | 18.5 | 17.8 | 18.4 | 18.9 | 19.0 | 16.4 |

Examples 51 to 58 and Comparative Example 51

<4> Scavenging Properties in Urethane Resin (Polyurethane Foam)

<4-1> Production of Polyurethane Foam

In accordance with the compounding formulation shown in Table 7, 100 parts by weight of polyol (SANNIX KC760, available from Sanyo Chemical Industry Ltd.), 100 parts by weight of polyisocyanate (TDI-80/Crude MDI=80/0 (weight ratio), NCO %=44.6], 3 parts by weight of ion-exchange water, 1 part by weight of a urethanization catalyst (RZETA, available from Tosoh Corp.), 1 part by weight of a urethanization catalyst (DABCO, NE300, available from Air Products Japan, Inc.), and 1 part by weight of any of the aldehyde scavengers (X-1) to (X-7) and (X-12) or 0.5 parts by weight of the aldehyde scavenger (Comparative X-1) were stirred in Homodisper (mixer available from Tokushu Kika Kogyo Co., Ltd.) at 4000 rpm for six seconds. The mixture was injected into an aluminum mold (300 mm (length)×300 mm (width)×100 mm (height)) whose temperature was controlled to 65° C., and molded by curing for five minutes (the duration from the raw material injection to demolding). Thus, a polyurethane foam (foam density: 45 kg/m$^3$) was obtained.

<4-2> Moldability (Mold Fouling Resistance)

The above-described production of the polyurethane foam was performed 20 times consecutively. The condition of the surface of the aluminum mold was observed and evaluated using the following <Evaluation criteria>. The results are shown in Table 7.

<Evaluation Criteria>

Excellent: No deposits are on the aluminum mold surface at all.

Good: Almost no deposits are on the aluminum mold surface.

Fair: A small amount of deposits are on the aluminum mold surface.

Poor: A large amount of deposits are on the aluminum mold surface.

The polyurethane foams obtained in Examples 51 to 58 had better moldability (mold fouling resistance) than the polyurethane foam obtained in Comparative Example 51.

<4-3> Amount of Aldehyde Released

A foam sample for aldehyde content measurement having a size of 100 mm×100 mm×33 mm was cut from a center portion of each of the polyurethane foams.

Aldehydes volatilized from the polyurethane foam were collected in a 2,4-dinitrophenylhydrazine (DNPH) cartridge according to the procedures described in JASO M903 (2015).

The amount of the aldehydes collected in the DNPH cartridge was determined as follows: the aldehydes were extracted with 5 mL of acetonitrile from the cartridge; and the extract was analyzed by HPLC. The HPLC was performed under the following conditions. The calibration curves were prepared by diluting a 6 aldehyde compounds mixture standard solution (FUJIFILM Wako Pure Chemical Corporations Co., Ltd.) with acetonitrile. The amount of aldehydes (pg/g) volatilized from the polyurethane foam is expressed as a value per gram of the sample. The measurement results of formaldehyde, acetaldehyde, and propionaldehyde are shown in Table 7.

<HPLC Measurement Conditions>

HPLC: ACQUITY UPLC H-CLASS available from Waters Corporation

Column: ZORBAX Eclipse XDB-C8, 4.6×250 mm, 5 μm

Developing solution: acetonitrile/water (volume ratio) =50/50

Injection volume: 20 μL

Flow rate: 0.8 mL/min

<4-4> Measurement of Physical Properties of Polyurethane Foam

The physical properties were determined as follows. Hardness at 25° C. (25%-ILD): in accordance with JIS K 6400 (Unit: N/314 cm$^2$)

Tensile strength: in accordance with JIS K 6400 (Unit: N/cm$^2$)

The results are shown in Table 7. The hardness at 25° C. (25%-ILD) was 52 N/314 cm$^2$ and the tensile strength was 3.7 N/cm$^2$ when no aldehyde scavenger (X) was added.

TABLE 7

| | | | Example | | | | | | | | Comparative Example |
|---|---|---|---|---|---|---|---|---|---|---|---|
| | | | 51 | 52 | 53 | 54 | 55 | 56 | 57 | 58 | 51 |
| Compounding formulation | Aldehyde scavenger | X-1 | 1 | | | | | | | | |
| | | X-2 | | 1 | | | | | | | |

TABLE 7-continued

| | | Example | | | | | | | | Comparative Example |
|---|---|---|---|---|---|---|---|---|---|---|
| | | 51 | 52 | 53 | 54 | 55 | 56 | 57 | 58 | 51 |
| (parts by weight) | X-3 | | | 1 | | | | | | |
| | X-4 | | | | 1 | | | | | |
| | X-5 | | | | | 1 | | | | |
| | X-6 | | | | | | 1 | | | |
| | X-7 | | | | | | | 1 | | |
| | X-12 | | | | | | | | 1 | |
| | Comparative X-1 | | | | | | | | | 0.5 |
| | DABUCO NE300 | 1 | 1 | 1 | 1 | 1 | 1 | 1 | 1 | 1 |
| | RZETA | 1 | 1 | 1 | 1 | 1 | 1 | 1 | 1 | 1 |
| | Ion-exchange water | 3 | 3 | 3 | 3 | 3 | 3 | 3 | 3 | 3 |
| | Polyisocyanate | 100 | 100 | 100 | 100 | 100 | 100 | 100 | 100 | 100 |
| | SANNIX KC760 | 100 | 100 | 100 | 100 | 100 | 100 | 100 | 100 | 100 |
| Evaluation | Amount of formaldehyde released (μg/g) | 0.003 | 0.003 | 0.004 | 0.003 | 0.004 | 0.005 | 0.005 | 0.005 | 0.006 |
| | Amount of acetaldehyde released (μg/g) | 0.01 | 0.009 | 0.01 | 0.008 | 0.12 | 0.011 | 0.012 | 0.012 | 0.015 |
| | Amount of propionaldehyde released (μg/g) | 0.012 | 0.011 | 0.012 | 0.01 | 0.011 | 0.012 | 0.014 | 0.013 | 0.02 |
| | Mold fouling resistance | Excel-lent | Excel-lent | Excel-lent | Excel-lent | Excel-lent | Excel-lent | Excel-lent | Excel-lent | Fair |
| | Hardness at 25° C. (25% ILD) ($N/314\ cm^2$) | 56 | 55 | 53 | 54 | 55 | 53 | 56 | 56 | 51 |
| | Tensile strength ($N/cm^2$) | 3.8 | 3.8 | 3.7 | 3.7 | 3.8 | 3.9 | 3.7 | 3.8 | 3.6 |

Examples 61 to 65 and Comparative Examples 61 to 63

<5> Scavenging Properties in Polyacetal Resin

<5-1> Production of Polyacetal Resin Composition and Molded Article

In accordance with the compounding formulation (parts by weight) shown in Table 8, the components to be compounded were blended using a Henschel mixer for three minutes and then melt-kneaded in a vented twin-screw extruder at 100 rpm and at 200° C. with a residence time of five minutes. Thus, polyacetal resin compositions were obtained. The polyacetal resin used was DURACON M90-44 (standard grade) available from Polyplastics Co. Ltd.

The resulting polyacetal resin compositions were each molded using an injection molding machine ("PS40E5 ASE" available from Nissei Plastic Industrial Co., Ltd.) at a cylinder temperature of 210° C. and a mold temperature of 60° C. Thus, molded articles were produced and evaluated by the following performance tests. The results are shown in Table 8.

<5-2> Amount of Formaldehyde Released

<Evaluation of Aldehyde Scavenging Properties> (VDA 275 Method)

A 1-L polyethylene container was charged with 50 mL of distilled water and any of the above-described molded specimens (100×40×3 mm) produced using the injection molding machine (each molded specimen produced had been allowed to stand at room temperature for 24 hours in a plastic bag with a zipper). The contents were sealed and heated at 60° C. for three hours. The formaldehyde dissolved in the distilled water was reacted with acetylacetone in the presence of ammonium ions at 60° C. for 10 minutes. The absorption peaks of the reaction product were obtained by spectrophotometric analysis, and the amount of formaldehyde released per weight of the specimen (μg/g) was determined from the absorption peak at a wavelength of 412 nm.

<5-3> Moldability (Mold Fouling Resistance)

The above-described injection molding was performed 500 times consecutively, and the condition of the surface of the mold was observed and evaluated using the following <Evaluation criteria>.

<Evaluation Criteria>

Excellent: No deposits are on the metal mold surface at all.

Good: Almost no deposits are on the metal mold surface.

Fair: A small amount of deposits are on the metal mold surface.

Poor: A large amount of deposits are on the metal mold surface.

<5-4> Flexural Strength, Flexural Modulus (Evaluation of Mechanical Strength of Molded Article)

A molded specimen (80×10×4 mm) was subjected to measurement of flexural strength and flexural modulus at 23° C. in accordance with ISO 178.

The flexural strength was 70 MPa and the flexural modulus was 1900 MPa when no aldehyde scavenger (X) was added.

TABLE 8

| | | | Example | | | | | Comparative Example | | |
|---|---|---|---|---|---|---|---|---|---|---|
| | | | 61 | 62 | 63 | 64 | 65 | 61 | 62 | 63 |
| Compounding formulation (parts by weight) | Aldehyde scavenger | X-8 | 0.3 | | | | | | | |
| | | X-9 | | 0.3 | | | | | | |
| | | X-10 | | | 0.3 | | | | | |
| | | X-13 | | | | 0.3 | | | | |
| | | X-14 | | | | | 0.3 | | | |
| | | Comparative X-1 | | | | | | 0.1 | 0.5 | |
| | | Comparative X-2 | | | | | | | | 0.3 |
| | DURACON M90-44 | | 100 | 100 | 100 | 100 | 100 | 100 | 100 | 100 |
| Evaluation | Amount of formaldehyde released (μg/g) | | 0.4 | 0.5 | 0.7 | 0.8 | 0.7 | 4.3 | 1.4 | 3.6 |
| | Mold fouling resistance | | Excellent | Excellent | Excellent | Excellent | Excellent | Fair | Poor | Poor |
| | Flexural strength (MPa) | | 71 | 71 | 70 | 70 | 70 | 70 | 70 | 69 |
| | Flexural modulus (MPa) | | 1900 | 1910 | 1890 | 1900 | 1900 | 1890 | 1900 | 1880 |

Examples 71 and 72 and Comparative Examples 71 and 72

<6> Scavenging Properties in Polyolefin Resin

<6-1> Production of Polyolefin Resin Composition and Molded Article

In accordance with the compounding formulation shown in Table 9, the components to be compounded were blended using a Henschel mixer for three minutes and then melt-kneaded in a vented twin-screw extruder at 100 rpm and at 230° C. with a residence time of five minutes. Thus, polyolefin resin compositions were obtained. The resulting resin compositions were each cut into pellets using a pelletizer. The polyolefin resin used was "Daicel PP PT2N1" available from Daicel Miraizu Ltd.

The resulting polyolefin resin compositions were each then molded using an injection molding machine ("PS40E5 ASE" available from Nissei Plastic Industrial Co., Ltd.) at a cylinder temperature of 230° C. and a mold temperature of 60° C. Thus, molded articles were produced and evaluated by the following performance tests. The results are shown in Table 9.

<6-2> Amount of Aldehyde Released

<Evaluation of Aldehyde Scavenging Properties>

The pelletized sample in an amount of 200 g was placed in a 10 liter (L) (gas volume) Tedlar® polyvinyl fluoride (PVF) bag (available from Delin Co., Ltd., China), and to the bag was supplied 5 L of nitrogen. The sample was allowed to stand at 65° C. for two hours. Then, nitrogen gas in the gas bag was discharged with an air pump at 330 mL/min over 13 minutes. The released carbonyls were absorbed on a DNPH cartridge (CNWBOND DNPH-silica cartridge, 350 mg, catalog no. SEEQ-144102, available from Anple Co., Ltd.).

After the absorption, the DNPH cartridge was clutch with 1 g (accurately weighed) of acetonitrile (ACN), and the ACN solution was analyzed by HPLC to quantify the carbonyls in the sample.

The calibration curves were prepared by diluting a 6 aldehydes-DNPH mixture standard solution (FUJIFILM Wako Pure Chemical Corporations Co., Ltd.) with acetonitrile.

<HPLC Measurement Conditions>

HPLC: ACQUITY UPLC H-CLASS available from Waters Corporation

Column: WAKO-PAK WAKOSIL-DNPH 4.6×250 ram

Developing solution:

(A) Wakosil®, DNPH eluent A (B) Wakosil®, DNPH eluent B

Gradient (Liquid B concentration (%) is expressed in vol %)

0 to 16 min B: 10%

16 to 35 min B: 10 to 90%

35 to 45 min B: 90%

Injection volume: 20 μL

Flow rate: 0.6 mL/min

<6-3> Tensile Strength, Flexural Strength, Flexural Modulus (Evaluation of Mechanical Strength of Molded Article)

The tensile strength was measured at 23° C. in accordance with ISO 527.

The flexural strength and flexural modulus were measured at 23° C. in accordance with ISO 178.

The tensile strength was 24 MPa, the flexural strength was 38 MPa, and the flexural modulus was 2800 MPa when no aldehyde scavenger (X) was added.

<6-4> Moldability (Mold Fouling Resistance)>

The above-described injection molding was performed 500 times consecutively, and the condition of the surface of the mold was observed and evaluated using the following <Evaluation criteria>.

<Evaluation Criteria>

Excellent: No deposits are on the metal mold surface at all.

Good: Almost no deposits are on the metal mold surface.

Fair: A small amount of deposits are on the metal mold surface.

Poor: A large amount of deposits are on the metal mold surface.

TABLE 9

| | | | Example | | Comparative Example | |
|---|---|---|---|---|---|---|
| | | | 71 | 72 | 71 | 72 |
| Compounding formulation (parts) | Aldehyde scavenger | X-11 | 0.3 | | | |
| | | X-15 | | 0.3 | | |
| | | Comparative X-1 | | | 0.1 | 0.5 |

TABLE 9-continued

| | | Example | | Comparative Example | |
|---|---|---|---|---|---|
| | | 71 | 72 | 71 | 72 |
| | Talc (JetFil700) | 15 | 15 | 15 | 15 |
| | Daicel PP PT2N1 | 85 | 85 | 85 | 85 |
| Evaluation | Amount of formaldehyde released ($mg/m^3$) | 0.09 | 0.11 | 0.22 | 0.18 |
| | Amount of acetaldehyde released ($mg/m^3$) | 0.6 | 0.9 | 2.1 | 1.5 |
| | Amount of hexanal released ($mg/m^3$) | 0.7 | 0.9 | 1.8 | 1.3 |
| | Mold fouling resistance | Excellent | Excellent | Fair | Poor |
| | Tensile strength (MPa) | 24 | 24 | 24 | 24 |
| | Flexural strength (MPa) | 39 | 39 | 38 | 37 |
| | Flexural modulus (MPa) | 2900 | 2800 | 2800 | 2700 |

The results in Tables 4 to 9 show that the aldehyde scavengers (X) of the present invention have better aldehyde scavenging properties than the comparative ones. The resins containing the aldehyde scavengers (X) of the present invention have excellent moldability (mold fouling resistance). Use of the aldehyde scavengers (X) of the present invention can reduce the amount of aldehydes released and can yield a resin composition having excellent moldability (mold fouling resistance). Furthermore, when the aldehyde scavenger (X) is added to the resin (D) containing formaldehyde as a constituent monomer (urea-melamine resin, phenolic resin, or melamine resin), urethane resins, polyacetal resins, or polyolefin resins, the mechanical strength of these resins does not decrease.

INDUSTRIAL APPLICABILITY

The aldehyde scavenger of the present invention can be used as various aldehyde scavengers. In particular, the aldehyde scavenger is suitable and very useful as aldehyde scavengers for resins containing formaldehyde as a constituent monomer, aldehyde scavengers for urethane resins, aldehyde scavengers for polyacetal resins, and aldehyde scavengers for polyolefin resins.

The invention claimed is:

1. An aldehyde scavenger comprising at least one selected from the group consisting of:

(1) a copolymer (A) containing a (meth)acrylamide (a) and an acid group-containing unsaturated monomer (b) as constituent monomers; and (2) a mixture containing a (co)polymer (B) and a (co) polymer (C), the (co)polymer (B) containing the (meth)acrylamide (a) as a constituent monomer but not containing the acid group-containing unsaturated monomer (b) as a constituent monomer, and the (co)polymer (C) containing the acid group-containing unsaturated monomer (b) as a constituent monomer but not containing the (meth) acrylamide (a) as a constituent monomer, wherein a weight ratio [(a)/(b)] of the (meth)acrylamide (a) to the acid group-containing unsaturated monomer (b) is 40/60 to 99/1.

2. The aldehyde scavenger according to claim 1, wherein the copolymer (A), the (co)polymer (B), and the (co)polymer (C) each have a weight average molecular weight (Mw) of 2,000 to 100,000.

3. The aldehyde scavenger according to claim 1, wherein the copolymer (A) further comprises, as a constituent monomer, at least one monomer (c) selected from the group consisting of a polyoxyalkylene group-containing (meth)acrylic acid ester (c1) and an alkyl group- or hydroxyalkyl group-containing C4-C30 (meth)acrylic acid alkyl ester (c2).

4. The aldehyde scavenger according to claim 1, wherein at least one selected from the group consisting of the (co)polymer (B) and the (co)polymer (C) further comprises, as a constituent monomer, at least one monomer (c) selected from the group consisting of a polyoxyalkylene group-containing (meth)acrylic acid ester (c1) and an alkyl group- or hydroxyalkyl group-containing C4-C30 (meth)acrylic acid alkyl ester (c2).

5. The aldehyde scavenger according to claim 1, comprising:

a product of a neutralization of the copolymer (A) and/or the (co)polymer (C) with a base (E), with a neutralization ratio of 1 to 120%.

6. A resin composition comprising:

the aldehyde scavenger according to claim 1; and at least one resin selected from the group consisting of polyester resins, polyacetal resins, polyolefin resins, phenolic resins, urethane resins, melamine resins, urea resins, and urea-melamine resins.

* * * * *